United States Patent
Fujiwara et al.

(10) Patent No.: US 8,993,926 B2
(45) Date of Patent: Mar. 31, 2015

(54) METHOD FOR ARC WELDING (75) Inventors: Junji Fujiwara, Osaka (JP); Atsuhiro Kawamoto, Hyogo (JP); Akira Nakagawa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 311 days.

(21) Appl. No.: 13/517,085

(22) PCT Filed: Sep. 28, 2011

(86) PCT No.: PCT/JP2011/005447
§ 371 (c)(1),
(2), (4) Date: Jun. 19, 2012

(87) PCT Pub. No.: WO2012/046411
PCT Pub. Date: Apr. 12, 2012

(65) Prior Publication Data
US 2012/0255940 A1 Oct. 11, 2012

(30) Foreign Application Priority Data

Oct. 7, 2010 (JP) .................................. 2010-227099

(51) Int. Cl.
*B23K 9/00* (2006.01)
*B23K 9/09* (2006.01)
*B23K 9/10* (2006.01)

(52) U.S. Cl.
CPC ................. *B23K 9/09* (2013.01); *B23K 9/1012* (2013.01)
USPC ....................... 219/137 R; 219/136

(58) Field of Classification Search
CPC ............................... B23K 9/1012; B23K 9/09
USPC ............ 219/121.45, 121.46, 121, 57, 130.21, 219/130.31, 130.51
See application file for complete search history.

(56) References Cited

U.S. PATENT DOCUMENTS

| 4,560,857 A * | 12/1985 | Segawa et al. ........... 219/130.21 |
| 2005/0161148 A1* | 7/2005 | Fukuta et al. ............ 156/89.22 |
| 2008/0006616 A1* | 1/2008 | Hutchison et al. ....... 219/130.21 |
| 2008/0169276 A1* | 7/2008 | Mukai et al. ............ 219/124.01 |
| 2008/0314884 A1 | 12/2008 | Fujiwara et al. |

FOREIGN PATENT DOCUMENTS

| EP | 972604 | 1/2000 |
| EP | 1464432 | 10/2004 |
| JP | 03-204177 | 9/1991 |
| JP | 04-237565 | * 8/1992 | ............... B23K 9/10 |
| JP | 2534374 | 9/1996 |
| JP | 09-038773 | 2/1997 |

(Continued)

OTHER PUBLICATIONS

International Search Report of PCT Application No. PCT/JP2011/005447 dated on Nov. 22, 2011.

(Continued)

*Primary Examiner* — Thien S Tran
(74) *Attorney, Agent, or Firm* — Panasonic Patent Center (57) ABSTRACT

A method for arc welding can control the increase slopes of the short-circuit current and the inflection point of the increase slopes in the welding start period to be smaller than in the steady-state welding period. Thus, the increase slopes of the short-circuit current and the inflection point are made different between the welding start period and the steady-state welding period, thereby reducing sputtering in the welding start period.

16 Claims, 9 Drawing Sheets

(56) References Cited

FOREIGN PATENT DOCUMENTS

| | | |
|---|---|---|
| JP | 09-308968 | 12/1997 |
| JP | 2004-042100 | 2/2004 |
| JP | 2006-116561 | 5/2006 |
| JP | 2007-216268 | 8/2007 |

OTHER PUBLICATIONS

English Translation of Chinese Search Report of Chinese Application No. 201180004853.7 dated on Jan. 6, 2014.
The Extended European Search Report dated Dec. 4, 2014 for the related European Patent Application No. 11830345.2.

* cited by examiner

ID FOR ARC WELDING

TECHNICAL FIELD

The present invention relates to a method and apparatus for arc welding in which welding is performed by alternating a short-circuit state and an arc state.

BACKGROUND ART

A welding operation includes a sputter removal process, which is considered a time inefficient process. To reduce the numbers of times of the sputter removal process, it is necessary to reduce sputtering. A well-known technique to reduce sputtering is a consumable electrode arc welding in which welding is performed by feeding a welding wire in alternating forward and backward directions and by alternating a short-circuit state and an arc state (see, for example, Patent Literature 1). The following is a description, with reference to FIG. 9, of an example of a method for controlling arc welding in which welding is performed by alternating a short-circuit state and an arc state while feeding a welding wire as a consumable electrode.

Figure 9:
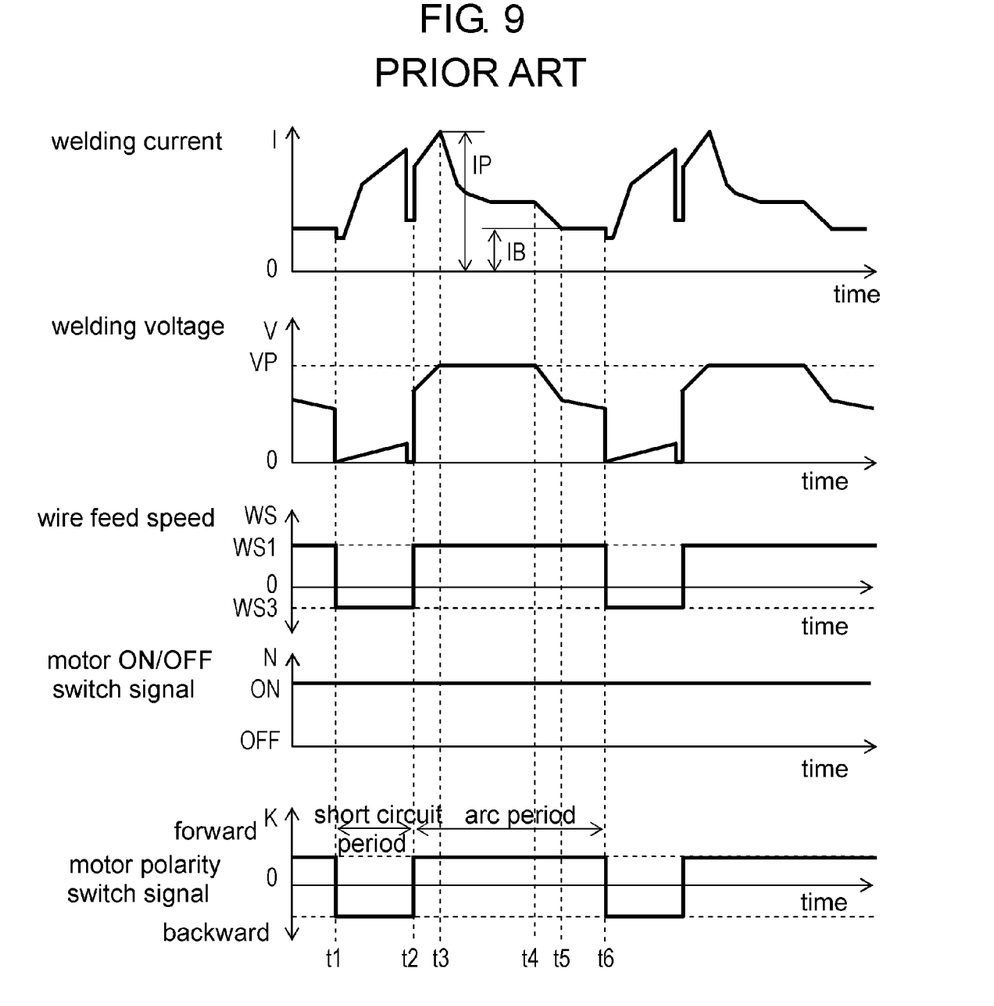
FIG. 9 shows time waveforms of a wire feed speed, a welding output, and other elements according to conventional arc welding.

FIG. 9 shows time waveforms of a wire feed speed, a welding output, and other elements according to the conventional arc welding. As shown in FIG. 9, in a short circuit period from a time t1 when a short circuit occurs until a time t2 when an arc occurs, the wire feed speed is changed from a basic feed speed to a backward feed speed. In an arc period from the time t2 when the arc occurs until a time t6 when another short circuit occurs, the wire feed speed is accelerated to return to the basic feed speed. In the arc period, from the time t2 when the arc occurs until a time t3, which is a first predetermined time, the welding current is increased to reach a predetermined peak current IP. After reaching the predetermined peak current IP at the time t3, the welding current may be kept at the peak current IP for a predetermined period. From the times t3 until a time t4, the welding voltage is controlled to be constant, and the welding current based on the constant voltage is outputted. From the time t4, the welding current is decreased to reach a predetermined base current IB, which is lower than the predetermined peak current IP. From a time t5 until the time t6 when the arc period ends, the welding current is kept at the predetermined base current IB.

As described above, the transfer of molten metal of the wire to the base material during a short circuit is mechanically secured by feeding the wire in the backward direction. This regulates the irregular short-circuit cycle, which is the principal cause of sputtering, thereby reducing sputtering and stabilizing a short-circuit transfer welding process.

The above-described conventional arc welding mechanically secures the transfer of the molten metal of the wire to the base material during a short circuit. This regulates the irregular short-circuit cycle, which is the principal cause of sputtering, thereby reducing sputtering.

In the welding start period, however, no weld pool has yet been formed in the base material (also referred to as the object to be welded). This makes it harder to open the short circuit than in the steady-state welding period (also referred to as the main welding period) in which the base material has a weld pool. Thus, in the welding start period, it takes a longer time and a larger welding current to open the short circuit. This may cause the molten metal of the wire to grow too much, thereby generating small sputters when the short-circuit opens.

CITATION LIST

Patent Literature

Patent Literature 1: Japanese Patent Unexamined Publication No. 2007-216268

SUMMARY OF THE INVENTION

An object of the present invention is to provide a method and apparatus for arc welding which can reduce sputtering in the welding start period. The reduction of sputtering is achieved by making the increase slopes of a short-circuit current and the current value at the inflection point, which is the change point of the different increase slopes of the short-circuit current between the welding start period and the steady-state welding period.

The method for arc welding of the present invention performs welding by alternating a short-circuit state and an arc state using a welding wire as a consumable electrode. In this method, the short-circuit current is controlled such that the increase slope of the short-circuit current is different between a steady-state welding period, which indicates a steady welding state and a welding start period, which precedes the steady-state welding period.

This method can reduce an increase in the short-circuit current even when no weld pool has yet been formed in the base material immediately after welding is started. As a result, the molten metal of the wire can properly grow, thereby reducing sputtering when the short circuit opens.

The arc welding apparatus of the present invention performs welding by alternating an arc state and a short-circuit state between an object-to-be-welded and a welding wire used as a consumable electrode. The arc welding apparatus includes the following units: a switching unit to control a welding output; a welding voltage detection unit to detect a welding voltage; a short-circuit/arc detection unit to detect whether the welding is in the short-circuit state or in the arc state based on the output of the welding voltage detection unit; a short-circuit control unit to control a short-circuit current in a short circuit period upon receiving a signal representing a short circuit from the short-circuit/arc detection unit; an arc control unit to control an arc voltage in an arc period upon receiving a signal representing an arc from the short-circuit/arc detection unit; a programmed current setting unit to allow the operator to set a programmed current; and a start-period setting unit to set a welding start period, which precedes a steady-state welding period based on the programmed current set in the programmed current setting unit. The short-circuit control unit includes the following units: a basic setting unit for the increase slope of the short-circuit current to determine the increase slope of the short-circuit current in the steady-state welding period based on the programmed current set by the programmed current setting unit; and a control unit for the increase slope of the short-circuit current to determine the increase slope of the short-circuit current in the welding start period by adding or subtracting a predetermined value to or from, or multiplying a predetermined rate by the increase slope of the short-circuit current determined by the basic setting unit for the increase slope of the short-circuit current based on the programmed current set by the programmed current setting unit. The short-circuit current is controlled such that the increase slope of the short-circuit current is different between the steady-state welding period, which indicates a steady welding state and the welding start period, which precedes the steady-state welding period.

This structure can reduce an increase in the short-circuit current even when no weld pool has yet been formed in the base material immediately after welding is started. As a result, the molten metal of the wire can properly grow, thereby reducing sputtering when the short circuit opens.

The arc welding apparatus of the present invention performs welding by alternating an arc state and a short-circuit state between an object-to-be-welded and a welding wire used as a consumable electrode. The arc welding apparatus includes the following units: a switching unit to control a welding output; a welding voltage detection unit to detect a welding voltage; a short-circuit/arc detection unit to detect whether the welding is in the short-circuit state or in the arc state based on the output of the welding voltage detection unit; a short-circuit control unit to control a short-circuit current in a short circuit period upon receiving a signal representing a short circuit from the short-circuit/arc detection unit; an arc control unit to control an arc voltage in an arc period upon receiving a signal representing an arc from the short-circuit/arc detection unit; a programmed current setting unit to allow an operator to set a programmed current; and a start-period setting unit to set a welding start period, which precedes a steady-state welding period based on the programmed current set in the programmed current setting unit. The short-circuit control unit includes the following units: a basic setting unit for the increase slope of the short-circuit current to determine a first increase slope of the short-circuit current and a second increase slope of the short-circuit current subsequent to the first increase slope in the steady-state welding period based on the programmed current set by the programmed current setting unit, a basic setting unit for an inflection point of the increase slopes of the short-circuit current for determining a current value at the inflection point at which the increase slope of the short-circuit current changes from the first increase slope to the second increase slope in the steady-state welding period based on the programmed current set by the programmed current setting unit; a control unit for the increase slope of the short-circuit current to determine the first and second increase slopes of the short-circuit current in the welding start period by adding or subtracting a predetermined value to or from, or multiplying a predetermined rate by the first and second increase slopes, respectively, of the short-circuit current in the steady-state welding period determined by the basic setting unit for the increase slope of the short-circuit current based on the programmed current set by the programmed current setting unit; and a control unit for the inflection point of the increase slopes of the short-circuit current to determine a current value at an inflection point in the welding start period by adding or subtracting a predetermined value to or from, or multiplying a predetermined value by the current value at the inflection point of the increase slopes of the short-circuit current in the steady-state welding period determined by the basic setting unit for the inflection point of the increase slopes of the short-circuit current based on the programmed current set by the programmed current setting unit. The short-circuit current is controlled such that the first and second increase slopes of the short-circuit current and the current value at the inflection point are different between the steady-state welding period, which indicates a steady welding state and the welding start period, which precedes the steady-state welding period.

This structure can reduce an increase in the short-circuit current even when no weld pool has yet been formed in the base material immediately after welding is started. As a result, the molten metal of the wire can properly grow, thereby reducing sputtering when the short circuit opens.

As described above, the present invention, the increase slopes of a short-circuit current and the current value at the inflection point, which is the change point of the increase slopes of the short-circuit current are made different between the welding start period and the steady-state welding period. This method can reduce an increase in the short-circuit current even when no weld pool has yet been formed in the base material immediately after welding is started. As a result, the molten metal of the wire can properly grow, thereby reducing sputtering when the short circuit opens.

DESCRIPTION OF EMBODIMENT

An exemplary embodiment of the present invention will be described as follows with reference to drawings. In these drawings, the same reference numerals are used for the same components, and hence the description thereof may be omitted.

First Exemplary Embodiment

The present first exemplary embodiment describes a method for arc welding first, and then describes an arc welding apparatus using this method.

Figure 1:
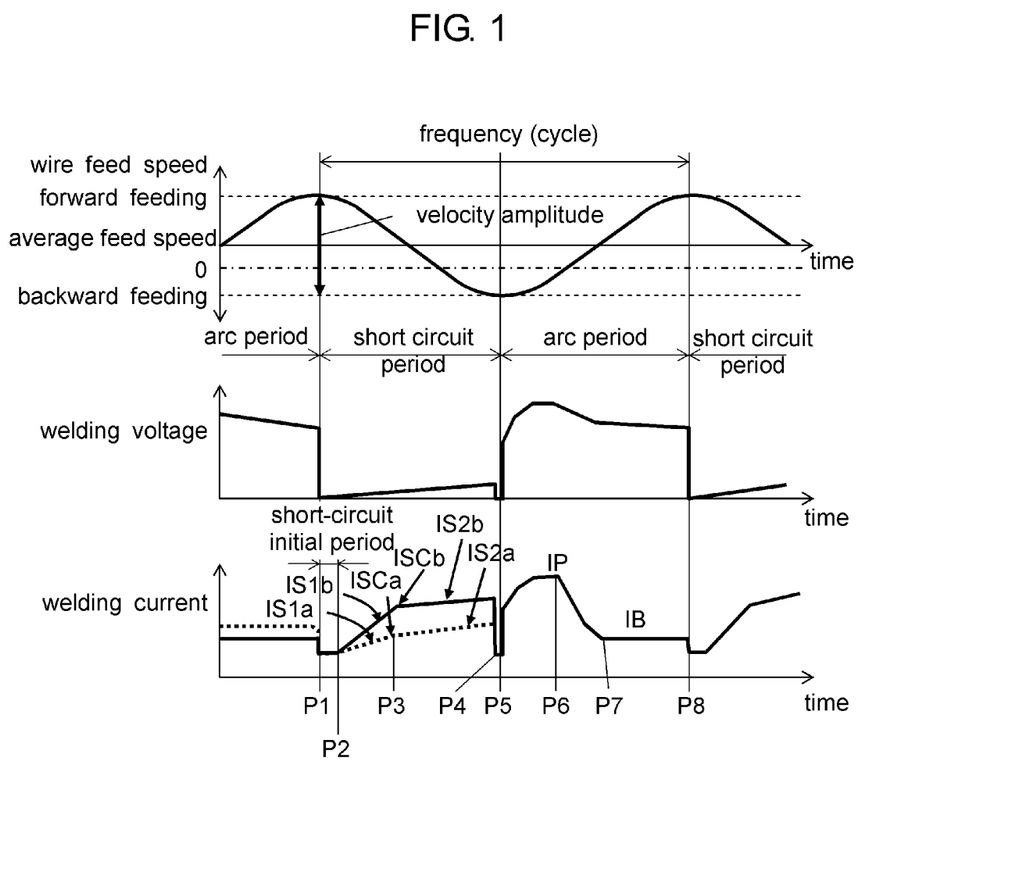
FIG. 1 shows time waveforms of a wire feed speed, a welding voltage, and a welding current according to a first exemplary embodiment of the present invention.
Figure 2:
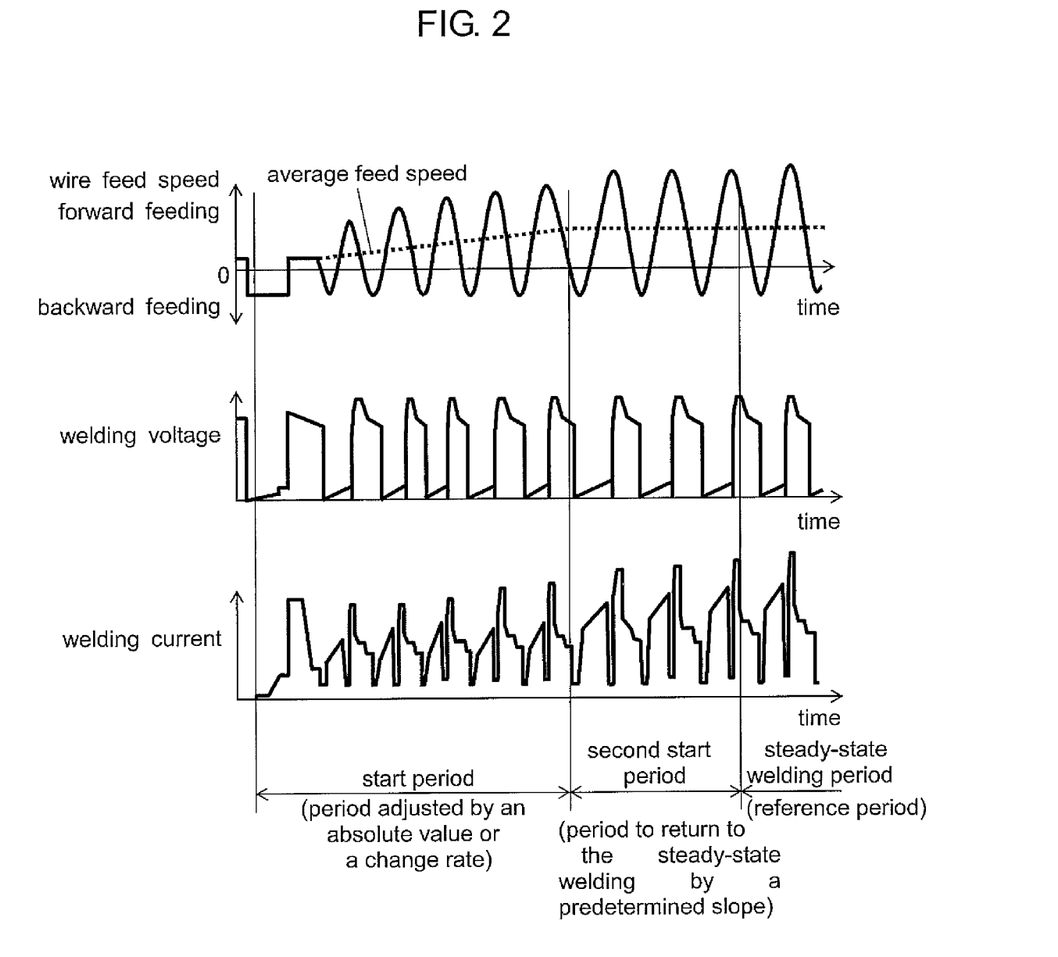
FIG. 2 shows time waveforms of a wire feed speed, a welding voltage, and a welding current in each of a welding start period, a second start period, and a steady-state welding period according to the first exemplary embodiment.

FIGS. 1 and 2 show time waveforms of a wire feed speed, a welding current, and a welding voltage in consumable electrode arc welding according to the first exemplary embodiment in which a short-circuit state and an arc state are alternated. FIG. 2 shows time waveforms of a wire feed speed, a welding current, and a welding voltage in each of a welding start period, a second start period, and a steady-state welding period. The time waveforms of the wire feed speed, the welding current, and the welding voltage shown in FIG. 1 are about the steady-state welding period.

As shown in FIG. 1, a time point P1 is when a short circuit occurs. At the time point P1, a short-circuit initial period is started. A time point P2 is when the short-circuit initial period is ended. At the time point P2, it is started to output a first increase slope di/dt of a short-circuit current (hereinafter, IS1a), which is the increment of the short-circuit current per unit of time. A time point P3 is an inflection point ISCa at which the increase slope changes from IS1a to a second increase slope di/dt of the short-circuit current (hereinafter, IS2a). A time point P4 is when it is ended to output IS2a. At the time point P4, a "narrow portion treatment" is performed in which the narrow portion of the droplet formed between the weld pool and the tip of the welding wire is detected, and then the welding current is immediately brought to a low level. A time point P5 is when the droplet moves away from the wire tip, thereby ending the short-circuit state and generating an arc. At the time point P5, it is started to output the peak current IP of the welding current immediately after the arc occurs. A time point P6 is when a transition is started from the peak current IP to the base current IB. From the time point P6 to a time point P7, either the welding current or the welding voltage may be controlled. From the time point P7 to a time point P8, the base current IB is outputted. At the time point P8, the next short circuit occurs.

In the wire feed control shown in FIG. 1, the wire is fed in sinusoidally alternating forward and backward directions at a predetermined frequency and velocity amplitude. A sinusoid is a basic waveform. When the wire is fed in the forward direction, a short circuit occurs at or around the time point P1, which is the crest of the wave. When the wire is fed in the backward direction, on the other hand, an arc occurs at or around the time point P5, which is the trough of the wave. When the wire is fed forward, a short circuit is likely to occur, and when the wire is fed backward, the short circuit is likely to open. Thus, a short-circuit state and an arc state occurs basically according to the wire feed control to feed the wire in alternating forward and backward directions.

As shown in FIG. 2 showing the time waveforms from the start of welding, welding is performed based on IS1a, IS2a, and the current value at the inflection point ISCa in a steady-state welding period, which indicates a steady welding state. IS2a follows IS1a and is based on a programmed current. The current value at the inflection point ISCa at which the increase slope changes from IS1a to IS2a is based on the programmed current.

In the welding start period shown in FIG. 2, the first increase slope di/dt (hereinafter, IS1b) of the short-circuit current and the second increase slope di/dt (hereinafter, IS2b) of the short-circuit current, and the current value at an inflection point ISCb of the short-circuit current are controlled to be smaller than in the steady-state welding period as will be described in detail later. The welding start period, which is, for example, experimentally determined, can be a period from the start of welding until the wire feed speed reaches the wire feed speed of the steady welding state. When the welding start period is ended, a weld pool is properly formed in the base material.

The second start period shown in FIG. 2 between the welding start period and the steady-state welding period is a period in which the increase slopes and the current value at the inflection point in the welding start period are changed to their equivalents in the steady-state welding period. The second start period can have a duration of several hundred milliseconds.

In FIG. 1, the solid lines represent the time waveforms (basic waveforms) of the welding current and the welding voltage based on the programmed current in the steady-state welding period. The dotted line represents an example of the time waveform when the increase slopes and the inflection point are changed in the welding start period. In FIG. 1, both the solid and dotted lines are shown in the same short circuit period for easy comparison.

The following is a description of the control of the steady-state welding period, which is the basic control for one cycle consisting of a short circuit period and an arc period from the time points P1 through P8 (the time waveforms shown by the solid lines) in FIG. 1.

At or around the time point P1, which is the crest of the sinusoidal wave, the wire is fed in the forward direction under the wire feed control, and the welding wire comes into contact with the object-to-be-welded, thereby generating a short circuit. In the short-circuit initial period between the time points P1 and P2, a short-circuit initial current, which is lower than the current outputted when the short circuit occurs, is outputted.

The following is the reason why the current in the short-circuit initial period from the time points P1 through P2 is made lower than the current outputted when the short circuit occurs. If the short-circuit current is increased to a high level immediately after a short circuit occurs, the short circuit may open at once, and be followed by another short circuit. This may break the short circuit cycle in which a short circuit occurs, then opens when a certain time has passed, and another short circuit occurs. To avoid this, the period to output a lower current than the short-circuit current is provided immediately after a short circuit occurs. In this period, a stable short circuit condition is established first, and then the short-circuit current is increased to a high level, thereby securing the above-described short circuit cycle.

The short-circuit initial period and the short-circuit initial current value are determined through experimental verification or other methods. Their basic set values are also determined through experimental verification or other methods to achieve stable welding. As a result, the ratio of the short circuit period to the arc period can be 50:50 when welding is performed at a certain speed (1 m/min in the present first exemplary embodiment). The short-circuit initial period and the short-circuit initial current value are stored in the form of a table or a mathematical formula in association with the programmed current in an unillustrated storage unit in the arc welding apparatus.

At the time point P2, the welding wire is in short circuit with the object-to-be-welded (also referred to as the base material). From this time point, the actual short-circuit current starts to increase along IS1a determined based on the programmed current. At the time point P3, the short-circuit current reaches the current value at the inflection point ISCa. From this time point, the actual short-circuit current starts to increase along IS2a determined based on the programmed current. Note that the basic set values of IS1a from the time points P2 through P3, IS2a from the time points P3 through P4, and the current value at the inflection point ISCa of the short-circuit current at the time point P3 are determined through experimental verification or other methods to achieve stable welding. As a result, the ratio of the short circuit period to the arc period can be 50:50 when welding is performed at a certain period (1 m/min in the present first exemplary embodiment). The increase slopes IS1a and IS2a, and the current value at the inflection point ISCa are stored in the form of a table or a mathematical formula in association with the programmed current in the unillustrated storage unit in the arc welding apparatus.

From the time points P4 through P5, the narrow portion of the molten tip of the welding wire is detected and the short-circuit current is immediately brought to a low level as conventionally known.

At or around the time point P5, which is the trough of the sinusoidal wave, the wire is fed in the backward direction under the wire feed control, and the welding wire moves away from the object-to-be-welded, opening the short circuit. From the time point P5 when an arc occurs in the arc period, the current is increased with a predetermined slope until it reaches the peak current IP at the time point P6. Note that it is possible to output the peak current IP for a predetermined time, if necessary.

From the time points P6 through P7, it is possible either to output the welding current based on the welding voltage under controlled voltage conditions, or to output a predetermined current under controlled current conditions. In either case, it is necessary to grow the droplet and to maintain an appropriate arc length.

From the time point P7, the welding current is kept at the base current IB until the next short circuit occurs at the time point P8. At or around the time point P8, which is the crest of the sinusoidal wave, the wire is fed in the forward direction under the wire feed control, and the welding wire comes into contact with the object-to-be-welded, generating another short circuit. Since the welding current is kept at the comparatively low base current IB, a short circuit becomes likely to occur, and a minor short circuit with a low welding current never cause large sputters.

The peak current IP and the peak current time from the time points P5 through P6, and the base current IB from the time points P7 through P8 are determined through experimental verification or other methods. The peak current IP, the peak current time, and the base current IB are stored in the form of a table or a mathematical formula in association with the programmed current in the unillustrated storage unit in the arc welding apparatus.

As described above, the control performed from the time points P1 through P8 is defined as one cycle of arc welding control, and welding is performed by repeating this cycle.

The following is a description of the control in the welding start period shown in FIG. 2.

The following is a description, with reference to FIGS. 1 and 2, of the control of IS1*b*, IS2*b*, and the inflection point (current value) ISCb at which the increase slope changes from IS1*b* to IS2*b* in the welding start period.

The wire is fed in sinusoidally alternating forward and backward directions at a predetermined frequency and amplitude based on the programmed current. This condition is defined as the basic waveform.

In the welding start period, the wire is fed periodically in the same manner as in the steady-state welding period. In the welding start period, however, sputtering would be caused if IS1*b* from the time points P2 through P3, IS2*b* from the time points P3 through P4, and the inflection point ISCb at the time point P3 have the same values as in the steady-state welding period. The reason for this is as follows. No weld pool has yet been formed in the base material immediately after welding is started. Therefore, it is harder to open the short circuit than in the steady-state welding period in which the base material has a weld pool.

When the base material has a weld pool, the surface tension and heat of the molten metal of the weld pool accelerate the opening of the short circuit. When the base material does not have a weld pool, on the other hand, it takes time until the short circuit opens because of the absence of the surface tension and heat of the weld pool. A long short-circuit time means that the short-circuit current is applied for a long time. This accelerates the melting of the wire, causing the molten metal droplet at the tip of the wire to grow too much. The too grown molten metal droplet generates small particles of molten metal between the molten metal that is transferred to the base material and the wire tip when the short circuit opens. The small particles of molten metal may sputter instead of dropping in the weld pool.

To avoid this, in the welding start period, it is necessary to control each of IS1*b* based on the programmed current, IS2*b* subsequent to IS1*b*, and the inflection point ISCb, which is the change point of the increase slopes of the short-circuit current to be smaller than in the steady-state welding period. The wire is fed in the backward direction in the short circuit period. Therefore, the short circuit can open within an acceptable time even if the increase slopes and the inflection point are reduced.

Figure 3:
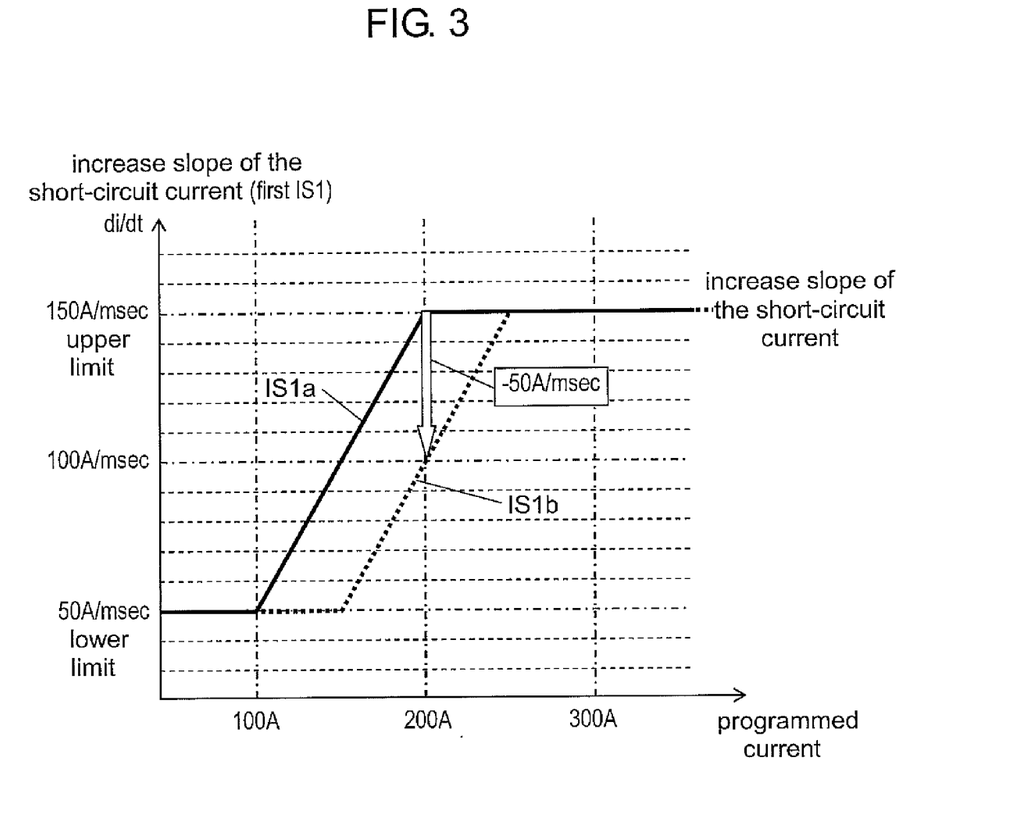
FIG. 3 shows an example of the relation between a programmed current and an increase slope of a short-circuit current according to the first exemplary embodiment.
Figure 4:
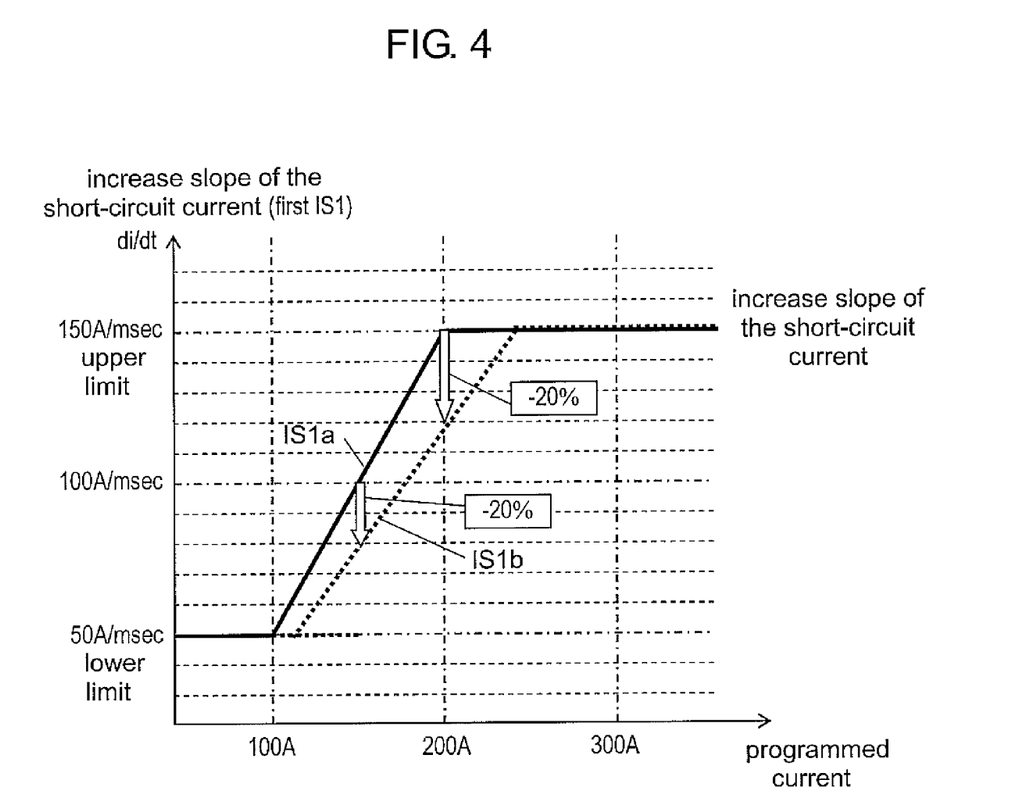
FIG. 4 shows another example of the relation between the programmed current and the increase slope of the short-circuit current according to the first exemplary embodiment.
Figure 5:
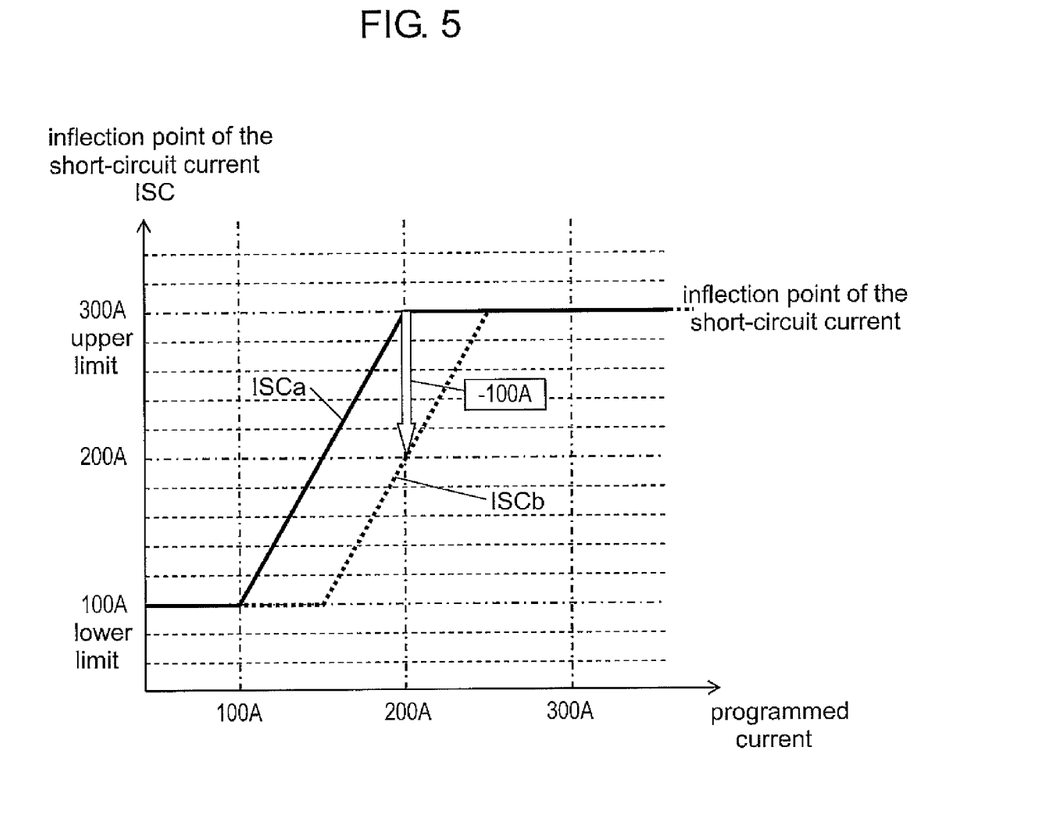
FIG. 5 shows an example of the relation between the programmed current and the current value at the inflection point, which is the change point of the increase slopes of the short-circuit current according to the first exemplary embodiment.
Figure 6:
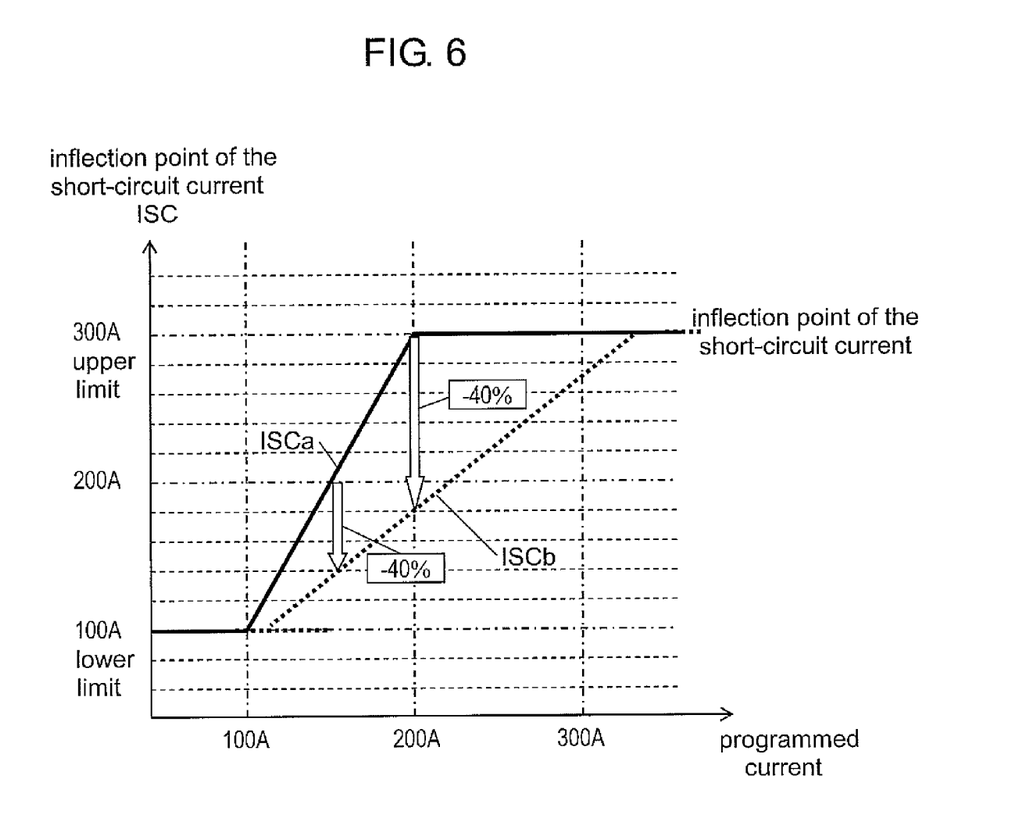
FIG. 6 shows another example of the relation between the programmed current and the current value at the inflection point, which is the change point of the increase slopes of the short-circuit current according to the first exemplary embodiment.

The following is a description, with reference to FIGS. 3 to 6, of how to adjust IS1*b*, IS2*b* subsequent to IS1*b*, and the inflection point ISCb at which the increase slope changes from IS1*b* to IS2*b* in the welding start period to be smaller than in the steady-state welding period. FIGS. 3 and 4 show the relation between the programmed current and IS1*a* and IS1*b* in the present first exemplary embodiment. FIGS. 5 and 6 show the relation between the programmed current and the inflection points ISCa and ISCb of the short-circuit current in the present first exemplary embodiment. Although FIGS. 3 and 4 show IS1*a* and IS1*b*, the same holds true for IS2*a* and IS2*b*.

As shown in FIG. 3 showing the increase slope di/dt (IS1) of the short-circuit current, in the steady-state welding period shown by the solid line, when the programmed current is 200 A, IS1*a* based on the programmed current is 150 A/msec. In the welding start period shown by the dotted line, the increase slope is changed from the steady-state welding period by the absolute value, which is −50 A/msec. As a result, IS2*a* in the welding start period is 100 A/msec. Thus, the increase slope in the welding start period can be determined by adding or subtracting (in this case, subtracting) a predetermined value to or from the increase slope in the steady-state welding period.

Alternatively, as shown in FIG. 4, the increase slope in the welding start period can be changed from the steady-state welding period by the rate of change, which is −20%. As a result, IS1*b* in the welding start period is 120 A/msec. Thus, the increase slope in the welding start period can be determined by multiplying a predetermined rate (in this case, 0.8) by the increase slope in the steady-state welding period.

As shown in FIG. 5 showing the inflection point ISC of the short-circuit current, in the steady-state welding period shown by the solid line, when the programmed current is 200 A, the current value at the inflection point ISCa of the short-circuit current based on the programmed current is 300 A. In the welding start period shown by the dotted line, the inflection point ISCb is changed from the steady-state welding period by the absolute value, which is −100 A. As a result, the inflection point ISCb of the short-circuit current is 200 A. Thus, the inflection point in the welding start period can be determined by adding or subtracting (in this case, subtracting) a predetermined value to or from the inflection point in the steady-state welding period.

Alternatively, as shown in FIG. 6, the inflection point ISCb in the welding start period can be changed from the steady-state welding period by the rate of change, which is −40%. As a result, ISCb in the welding start period is 180 A. Thus, the inflection point in the welding start period can be determined by multiplying a predetermined rate (in this case, 0.6) by the inflection point in the steady-state welding period.

As described above, the increase slopes of the short-circuit current and the inflection point of the short-circuit current in the welding start period are controlled to be smaller than IS1a, IS2a, and ISCa based on the programmed current in the steady-state welding period. As a result, the short circuit can open within an acceptable time even with a lower current, thereby reducing sputtering.

In the above-described example, the wire is fed in alternating forward and backward directions. When the wire is fed only in the forward direction as conventional cases, no weld pool has yet been formed in the base material immediately after welding is started. In such cases, the opening of the short circuit can be accelerated to shorten the short circuit period by controlling IS1b, IS1b, and ISCb to be larger than their equivalent values based on the programmed current in the steady-state welding period.

An example of adjusting the increase slopes of the short-circuit current and the inflection point in the welding start period is to store IS1b, IS2b, and ISCb in association with the programmed current in the unillustrated storage unit. Then, IS1b, IS2b, and ISCb are read based on the programmed current from the storage unit.

In FIGS. 3 through 6, the relation between the programmed current and IS1a or IS2a based on the programmed current, or the relation between the programmed current and ISCa based on the programmed current are shown as straight lines. Alternatively, these relations can be shown as quadratic curves or other curves.

As shown in FIGS. 3 through 6, the variation width of IS1a, IS1b, IS2a, and IS2b based on the programmed current, and the variation width of the inflection points ISCa and ISCb based on the programmed current may have an upper limit and a lower limit. This can prevent too much adjustment of the increase slopes and the current values at the inflection points of the short-circuit current. Without the upper or lower limit, IS1a, IS1b, IS2a, IS2b, and the inflection points ISCa, ISCb based on the programmed current might be changed too small or too large. This may greatly increase sputtering or cause an unstable arc.

The increase slopes IS1a, IS1b, IS2a, and IS2b and the values at the inflection points ISCa, ISCb of the short-circuit current are set based on the programmed current value of the welding current and also on at least one of the following items: the diameter, the type, and the extended length of the wire, which is a consumable electrode to be fed, and the type of a shielding gas to be fed.

The following is a description of the control of the second start period provided between the welding start period and the steady-state welding period as shown in FIG. 2.

As shown in FIG. 2, the second start period is a period to change IS1b, IS2b, and the inflection point ISCb of the short-circuit current in the welding start period to their equivalent values based on the programmed current in the steady-state welding period. More specifically, the second start period is a period to gradually change IS1b, IS2b, and the current value at the inflection point ISCb of the short-circuit current in the welding start period to IS1a, IS2a, and the inflection point ISCa of the short-circuit current based on the programmed current in the steady-state welding period. In this case, the change is performed by a predetermined increment per predetermined number of short circuits or per predetermined time. Thus, the second start period prevents IS1b, IS2b, and the inflection point ISCb of the short-circuit current when the welding start period is ended from being changed too suddenly to IS1a, IS1b, and the inflection point ISCa, respectively, of the short-circuit current in the steady-state welding period. The second start period is determined, for example, based on the programmed current and either a time to generate a predetermined number of short circuits or a predetermined time.

As described hereinbefore, according to the present exemplary embodiment, the increase slopes and the inflection point of the short-circuit current in the welding start period are controlled to be smaller than IS1b, IS2b, and the value at the inflection point ISCb of the short-circuit current based on the programmed current. Then, in the second start period, the increase slopes and the inflection point of the short-circuit current in the welding start period are changed to the increase slopes and the inflection point of the short-circuit current based on the programmed current in the steady-state welding period. This can reduce sputtering throughout the entire welding process from the welding start period through the steady-state welding period.

The wire is fed in sinusoidally alternating forward and backward directions, and the increase slopes and the inflection point of the short-circuit current in the welding start period are controlled to be smaller than in the steady-state welding period. This control particularly contributes to the reduction of sputtering in the welding start period.

Thus, the method for arc welding of the present invention performs welding by alternating a short-circuit state and an arc state using a welding wire as a consumable electrode. This method for arc welding controls a short-circuit current such that the increase slope of the short-circuit current is different between a steady-state welding period, which indicates a steady welding state, and a welding start period, which precedes the steady-state welding period.

This method can reduce an increase in the short-circuit current even when no weld pool has yet been formed in the base material immediately after welding is started. As a result, the molten metal of the wire can properly grow, thereby reducing sputtering when the short circuit opens.

The short-circuit current may be controlled such that the increase slope of the short-circuit current in the welding start period is smaller than in the steady-state welding period.

This method can reduce an increase in the short-circuit current even when no weld pool has yet been formed in the base material immediately after welding is started. As a result, the molten metal of the wire can properly grow, thereby reducing sputtering when the short circuit opens.

The short-circuit current may be controlled such that the increase slope of the short-circuit current in the steady-state welding period and the welding start period includes the first increase slope IS1a and the second increase slope IS2a subsequent to the first increase slope.

This method can reduce an increase in the short-circuit current even when no weld pool has yet been formed in the base material immediately after welding is started. As a result, the molten metal of the wire can properly grow, thereby reducing sputtering when the short circuit opens.

The short-circuit current may be controlled such that the current value at the inflection point ISCa at which the increase slope of the short-circuit current changes from the first increase slope IS1a to the second increase slope IS2a is different between the steady-state welding period and the welding start period.

This method can reduce an increase in the short-circuit current even when no weld pool has yet been formed in the base material immediately after welding is started. As a result, the molten metal of the wire can properly grow, thereby reducing sputtering when the short circuit opens.

In the steady-state welding period, the first and second increase slopes IS1a and IS2a of the short-circuit current, and the current value at the inflection point ISCa may be determined based on the programmed current. In the welding start period, the first and second increase slopes IS1b and slope IS2b of the short-circuit current, and the current value at the inflection point ISCb may be determined by adding or subtracting a predetermined value to or from, or multiplying a predetermined value by the first and second increase slopes IS1a and IS2a, respectively, of the short-circuit current and the current value at the inflection point ISCa, respectively, in the steady-state welding period.

As a result, the short circuit can open within an acceptable time even with a low current, thereby reducing sputtering.

The short-circuit current may be controlled such that the current value at the inflection point ISCb of the short-circuit current in the welding start period is smaller than the current value at the inflection point ISCa of the short-circuit current in the steady-state welding period.

As a result, the short circuit can open within an acceptable time even with a low current, thereby reducing sputtering.

The first and second increase slopes IS1a and IS2a of the short-circuit current and the current value at the inflection point ISCa in the steady-state welding period and the welding start period may have an upper limit and a lower limit.

This can prevent too much adjustment of the increase slopes and the current values at the inflection points ISC of the short-circuit current.

A second start period may be provided between the welding start period and the steady-state welding period. In the second start period, the first and second increase slopes of the short-circuit current and the current value at the inflection point obtained when the welding start period is ended may be gradually changed to their equivalents obtained when the steady-state welding period is started.

This can reduce sputtering throughout the entire welding process from the welding start period through the steady-state welding period.

The second start period may be a time to generate a predetermined number of short circuits or a predetermined time.

This can reduce sputtering throughout the entire welding process from the welding start period through the steady-state welding period.

When the welding is performed by alternating the short-circuit state and the arc state, the welding wire feed speed corresponding to the programmed current may be defined as an average feed speed, and the welding wire may be fed in alternating forward and backward directions at a predetermined frequency and a predetermined amplitude.

This method can reduce an increase in the short-circuit current even when no weld pool has yet been formed in the base material immediately after welding is started. As a result, the molten metal of the wire can properly grow, thereby reducing sputtering when the short circuit opens.

Figure 7:
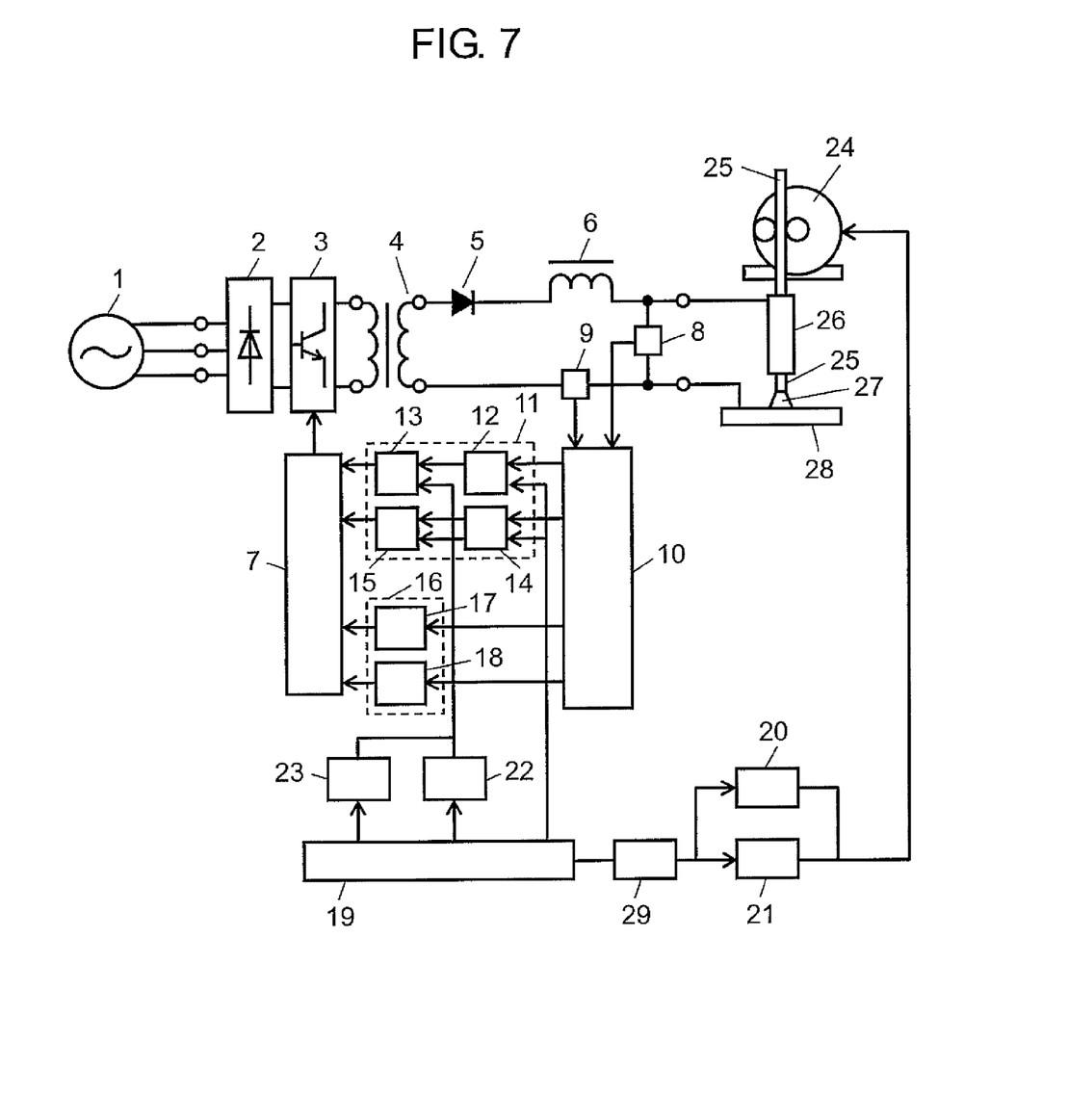
FIG. 7 is a schematic configuration view of an arc welding apparatus according to the first exemplary embodiment.

The arc welding apparatus performing the above-mentioned arc welding control according to the present first exemplary embodiment will be described as follows. FIG. 7 is a schematic configuration view of the arc welding apparatus, which has the following structure.

As shown in FIG. 7, the electric power from input power 1 is rectified by primary rectifying unit 2, converted to AD power by switching unit 3, and is stepped down by transformer 4. Then, the power is rectified by secondary rectifying unit 5 and DCL 6, which is an inductor, and is applied between welding wire 25 and object-to-be-welded 28 (also referred to as the base material). As a result, welding arc 27 occurs. Welding wire 25 is applied with the power via tip 26.

As shown in FIG. 7, the arc welding apparatus includes switching unit 3, drive unit 7 for controlling switching unit 3, welding voltage detection unit 8, welding current detection unit 9, short-circuit/arc detection unit 10, short-circuit control unit 11, and arc control unit 16. Welding voltage detection unit 8 is connected between welding power output terminals. Welding current detection unit 9 detects a welding output current. Short-circuit/arc detection unit 10 determines the presence or absence of a short circuit or an arc based on a signal from welding voltage detection unit 8. Short-circuit control unit 11 controls the short-circuit current in a short circuit period upon receiving a signal representing a short-circuit from short-circuit/arc detection unit 10. Arc control unit 16 controls the arc voltage in an arc period upon receiving a signal representing an arc from short-circuit/arc detection unit 10.

As shown in FIG. 7, the arc welding apparatus further includes programmed current setting unit 19, start-period setting unit 22, second start-period setting unit 23, setting unit 29 for the average wire feed speed, basic setting unit 20 for the wire feed frequency, and basic setting unit 21 for the wire feed amplitude. Programmed current setting unit 19 allows the operator to set a programmed current. Start-period setting unit 22 sets a welding start period based on the programmed current. Second start-period setting unit 23 sets a second start period based on the programmed current. Setting unit 29 for the average wire feed speed determines the average feed speed of the welding wire based on the programmed current. Basic setting unit 20 for the wire feed frequency sets a frequency for the wire feed control based on the average feed speed. Basic setting unit 21 for the wire feed amplitude sets an amplitude for the wire feed control based on the average feed speed. Arc control unit 16 includes basic setting unit 17 for the peak current and the base current, and control unit 18 for the peak current time. Basic setting unit 17 determines a peak current and a base current in an arc period based on the signal from short-circuit/arc detection unit 10. Control unit 18 determines a peak current time in an arc period.

First, the wire feed control is described as follows.

Basic setting unit 20 for the wire feed frequency and basic setting unit 21 for the wire feed amplitude each output to wire feeding motor 24 a wire feed speed at which the wire is fed in sinusoidally alternating forward and backward directions at a frequency and amplitude. The wire feed speed is outputted based on the programmed current value of programmed current setting unit 19, and the average feed speed, which is the wire feed speed determined by setting unit 29 for the average wire feed speed.

The relation between the average feed speed, frequency, and amplitude for the wire feed control and the programmed current is stored in the form of a table or a mathematical formula in the unillustrated storage unit, and is determined based on the programmed current.

Next, the welding control is described as follows.

Welding voltage detection unit 8, which is connected between the welding power output terminals, outputs a signal corresponding to the detected voltage to short-circuit/arc detection unit 10. From this determination result, short-circuit/arc detection unit 10 determines whether the welding output voltage is below a certain value or not based on the signal from welding voltage detection unit 8. Unit 10 then determines whether welding wire 25 is in contact with and short circuited to object-to-be-welded 28 or is in non-contact with it and welding arc 27 exists. Unit 10 then outputs a determination signal.

Short-circuit control unit 11 includes the following units: basic setting unit 12 for the increase slope di/dt of the short-circuit current; control unit 13 for the increase slope di/dt of the short-circuit current; basic setting unit 14 for the inflection point of the short-circuit current; and control unit 15 for the inflection point of the short-circuit current. Basic setting unit 12 for the increase slope di/dt sets the first and second increase slopes di/dt based on the set programmed current. Control unit 13 for the increase slope di/dt changes the increase slopes di/dt set in basic setting unit 12 based on start-period setting unit 22 and second start-period setting unit 23. Basic setting unit 14 for the inflection point sets an inflection point at which the increase slope changes from the first increase slope di/dt to the second increase slope di/dt based on the set programmed current. Control unit 15 for the inflection point changes the current value at the inflection point based on start-period setting unit 22 or the programmed current.

As described above, the arc welding apparatus having the above-described structure controls the increase slopes and the inflection point of the short-circuit current in the welding start period to be smaller than in the steady-state welding period, thereby reducing sputtering in the welding start period.

The arc welding apparatus of the present invention performs welding by alternating an arc state and a short-circuit state between object-to-be-welded 28 and welding wire 25 used as a consumable electrode. This arc welding apparatus includes switching unit 3, welding voltage detection unit 8, short-circuit/arc detection unit 10, short-circuit control unit 11, arc control unit 16, programmed current setting unit 19, and start-period setting unit 22. Switching unit 3 controls a welding output. Welding voltage detection unit 8 detects a welding voltage. Short-circuit/arc detection unit 10 detects whether the welding is in the short-circuit state or in the arc state based on the output of the welding voltage detection unit. Short-circuit control unit 11 controls a short-circuit current in a short circuit period upon receiving a signal representing a short circuit from short-circuit/arc detection unit 10. Arc control unit 16 controls an arc voltage in an arc period upon receiving a signal representing an arc from short-circuit/arc detection unit 10. Programmed current setting unit 19 allows the operator to set a programmed current. Start-period setting unit 22 sets a welding start period, which precedes a steady-state welding period based on the programmed current set in programmed current setting unit 19. Short-circuit control unit 11 includes basic setting unit 12 for the increase slope of the short-circuit current and control unit 13 for the increase slope of the short-circuit current. During welding, the short-circuit current is controlled such that the increase slope of the short-circuit current is different between the steady-state welding period, which indicates a steady welding state and the welding start period, which precedes the steady-state welding period. Basic setting unit 12 for the increase slope determines the increase slope of the short-circuit current in the steady-state welding period based on the programmed current set by programmed current setting unit 19. Control unit 13 for the increase slope of the short-circuit current determines the increase slope of the short-circuit current in the welding start period by adding or subtracting a predetermined value to or from, or multiplying a predetermined rate by the increase slope of the short-circuit current determined by basic setting unit 12 for the increase slope based on the programmed current set by programmed current setting unit 19.

This structure can reduce an increase in the short-circuit current even when no weld pool has yet been formed in the base material immediately after welding is started. As a result, the molten metal of the wire can properly grow, thereby reducing sputtering when the short circuit opens.

The short-circuit current may be controlled such that the increase slope of the short-circuit current in the welding start period is smaller than in the steady-state welding period. This structure can further reduce sputtering when the short circuit opens.

The arc welding apparatus of the present invention performs welding by alternating an arc state and a short-circuit state between object-to-be-welded 28 and welding wire 25 used as a consumable electrode. The arc welding apparatus includes switching unit 3, welding voltage detection unit 8, short-circuit/arc detection unit 10, short-circuit control unit 11, arc control unit 16, programmed current setting unit 19, and start-period setting unit 22. Switching unit 3 controls a welding output. Welding voltage detection unit 8 detects a welding voltage. Short-circuit/arc detection unit 10 detects whether the welding is in the short-circuit state or in the arc state based on the output of the welding voltage detection unit. Short-circuit control unit 11 controls a short-circuit current in a short circuit period upon receiving a signal representing a short circuit from short-circuit/arc detection unit 10. Arc control unit 16 controls an arc voltage in an arc period upon receiving a signal representing an arc from short-circuit/arc detection unit 10. Programmed current setting unit 19 allows the operator to set a programmed current. Start-period setting unit 22 sets a welding start period, which precedes a steady-state welding period based on the programmed current set in programmed current setting unit 19. Short-circuit control unit 11 includes the following units: basic setting unit 12 for the increase slope of the short-circuit current; basic setting unit 14 for the inflection point of the increase slopes of the short-circuit current; control unit 13 for the increase slope of the short-circuit current; and control unit 15 for the inflection point of the increase slopes of the short-circuit current. Basic setting unit 12 for the increase slope determines a first increase slope of the short-circuit current and a second increase slope of the short-circuit current subsequent to the first increase slope in the steady-state welding period based on the programmed current set by programmed current setting unit 19. Basic setting unit 14 for the inflection point of the increase slopes determines a current value at the inflection point at which the increase slope of the short-circuit current changes from the first increase slope to the second increase slope in the steady-state welding period based on the programmed current set by programmed current setting unit 19. Control unit 13 for the increase slope of the short-circuit current determines the first and second increase slopes of the short-circuit current in the welding start period by adding or subtracting a predetermined value to or from, or multiplying a predetermined rate by the first and second increase slopes, respectively, of the short-circuit current in the steady-state welding period determined by basic setting unit 12 for the increase slope of the short-circuit current based on the programmed current set by programmed current setting unit 19. Control unit 15 for the inflection point of the increase slopes of the short-circuit current determines a current value at an inflection point in the welding start period by adding or subtracting a predetermined value to or from, or multiplying a predetermined value by the current value at the inflection point of the increase slopes of the short-circuit current in the steady-state welding period determined by basic setting unit 14 for the inflection point of the increase slopes of the short-circuit current based on the programmed current set by programmed current setting unit 19. In the arc welding apparatus, the short-circuit current is controlled such that the first and second increase slopes of the short-circuit current and the current value at the inflection point are different between the steady-state welding period, which indicates a steady welding state and the steady-state welding period, which precedes the welding start period.

This structure can reduce an increase in the short-circuit current even when no weld pool has yet been formed in the base material immediately after welding is started. As a result, the molten metal of the wire can properly grow, thereby reducing sputtering when the short circuit opens.

In the arc welding apparatus of the present invention, the short-circuit current may be controlled such that the first and second increase slopes of the short-circuit current and the current value at the inflection point in the welding start period are smaller than in the steady-state welding period. This structure can further reduce sputtering when the short circuit opens.

The arc welding apparatus of the present invention further includes a second start-period setting unit. In the second start period, the first and second increase slopes of the short-circuit current and the current value at the inflection point obtained when the welding start period is ended may be gradually changed to their equivalents obtained when the steady-state welding period is started. The second start-period setting unit determines the second start period provided between the welding start period and the steady-state welding period based on the programmed current set by programmed current setting unit 19. This structure can further reduce sputtering when the short circuit opens.

The arc welding apparatus of the present invention may further include setting unit 29 for the average wire feed speed, basic setting unit 20 for the frequency, and basic setting unit 21 for the amplitude. In this case, welding is performed by feeding welding wire 25 in alternating forward and backward directions at a predetermined frequency and a predetermined amplitude and by alternating a short-circuit state and an arc state. Setting unit 29 for the average wire feed speed determines the average feed speed of the welding wire based on the programmed current set by programmed current setting unit 19. Basic setting unit 20 for the frequency sets a frequency for controlling the wire feed by feeding the wire in sinusoidally or trapezoidally alternating forward and backward directions based on the average feed speed of the welding wire set by setting unit 29 for the average wire feed speed. Basic setting unit 21 for the amplitude sets an amplitude for controlling the wire feed by feeding the wire in sinusoidally or trapezoidally alternating forward and backward directions based on the average feed speed of the welding wire set by setting unit 29 for the average wire feed speed. This structure can further reduce sputtering when the short circuit opens.

Each component of the arc welding apparatus shown in FIG. 7 may be either formed alone or combined with some other components.

In the present exemplary embodiment, the increase slopes di/dt and the inflection point of the short-circuit current are stored in the storage unit by associating them with the programmed current, but may alternatively be stored by associating them with the wire feed speed or the wire feed amount. This is because the programmed current is in proportion to the wire feed speed or the wire feed amount.

Figure 8:
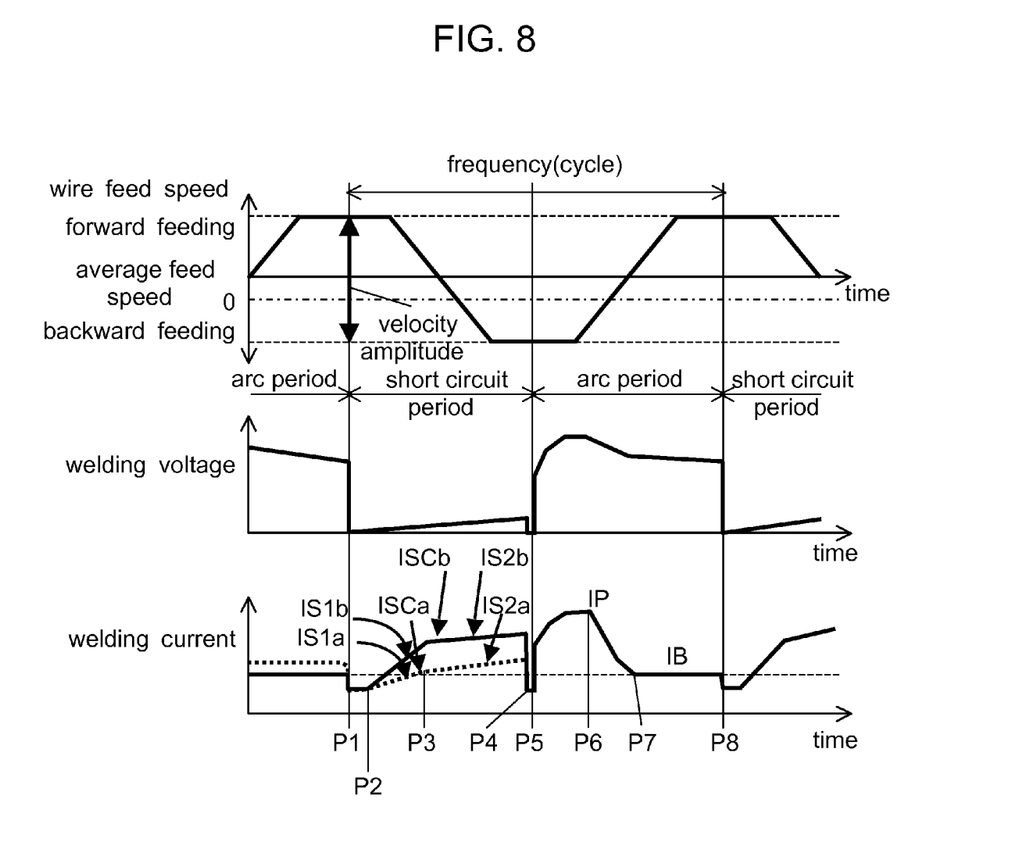
FIG. 8 shows time waveforms of a wire feed speed, a welding voltage, and a welding current according to the first exemplary embodiment.

In the present exemplary embodiment, the wire is fed by sinusoidal currents, but may alternatively be fed by trapezoidal currents as shown in FIG. 8. Thus, feeding the wire in alternating forward and backward directions at a predetermined frequency and amplitude has the same effect whether the currents are trapezoidal or sinusoidal.

INDUSTRIAL APPLICABILITY

According to the present invention, the increase slopes of the short-circuit current and the current value at the inflection point, which is the change point of the increase slopes of the short-circuit current are made different between the welding start period and the steady-state welding period. This can reduce an increase in the short-circuit current even when no weld pool has yet been formed in the base material immediately after welding is started. As a result, the molten metal of the wire can properly grow, thereby reducing sputtering when the short circuit opens. Thus, the method and apparatus for arc welding of the present invention are industrially useful.

REFERENCE MARKS IN THE DRAWINGS 1 input power
2 primary rectifying unit
3 switching unit
4 transformer
5 secondary rectifying unit
6 DCL
7 drive unit
8 welding voltage detection unit
9 welding current detection unit
10 short-circuit/arc detection unit
11 short-circuit control unit
12 basic setting unit for the increase slope of the short-circuit current
13 control unit for the increase slope of the short-circuit current
14 basic setting unit for the inflection point of the short-circuit current
15 control unit for the inflection point of the short-circuit current
16 arc control unit
17 basic setting unit for the peak current and the base current
18 control unit for the peak current time
19 programmed current setting unit
20 basic setting unit for the wire feed frequency
21 basic setting unit for the wire feed amplitude
22 start-period setting unit
23 second start-period setting unit
24 wire feeding motor
25 welding wire
26 tip
27 welding arc
28 object-to-be-welded
29 setting unit for the average wire feed speed

The invention claimed is:

1. A method for arc welding in which welding is performed by alternating a short-circuit state and an arc state using a welding wire as a consumable electrode, the method comprising:
   a first short-circuit welding for welding in a welding start period with a first short-circuit current; and
   a second short-circuit welding for welding in a welding steady period subsequent to the welding start period with a second short-circuit current, wherein:
   the first short-circuit current has a first increase slope, a second increase slope subsequent to the first increase slope and a first inflection point at which the first short-circuit current changes from the first increase slope to the second increase slope;
   the second short-circuit current has a third increase slope, a fourth increase slope subsequent to the third increase slope and a second inflection point at which the second short-circuit current changes from the third increase slope to the fourth increase slope;
   the third increase slope is steeper than the first increase slope; and the fourth increase slope is steeper than the second increase slope.

2. The method of claim 1, wherein:
the first increase slope is determined by subtracting a predetermined value from the third increase slope.

3. The method of claim 1, wherein:
the second increase slope is determined by subtracting a predetermined value from the fourth increase slope.

4. The method of claim 1, wherein:
the first increase slope is determined by multiplying a predetermined value by the third increase slope.

5. The method of claim 1, wherein:
the second increase slope is determined by multiplying a predetermined value by the fourth increase slope.

6. The method of claim 1, wherein
the first increase slope and the third increase slope have a common upper limit and a common lower limit.

7. The method of claim 1, wherein:
the second increase slope and the fourth increase slope have a common upper limit and a common lower limit.

8. The method of claim 1, wherein:
a welding current at the first inflection point is smaller than a welding current at the second inflection point.

9. The method of claim 8, wherein:
the welding current at the first inflection point is determined by subtracting a predetermined value from the welding current at the second inflection point.

10. The method of claim 8, wherein:
the welding current at the first inflection point is determined by multiplying a predetermined value by the welding current at the second inflection point.

11. The method of claim 1, wherein:
the welding currents at the first inflection point and the second inflection point have a common upper limit and a common lower limit.

12. The method of claim 1, further comprising:
a third short-circuit welding, after the first short-circuit welding, for welding in the welding start period with a third short-circuit current, wherein:
the third short-circuit current has a fifth increase slope, a sixth increase slope subsequent to the fifth increase slope and a third inflection point at which the third short-circuit current changes from the fifth increase slope to the sixth increase slope;
the fifth increase slope is steeper than the first increase slope and gentler than the third increase slope; and
the sixth increase slope is steeper than the second increase slope and gentler than the fourth increase slope.

13. The method of claim 12, wherein:
a short-circuit current is gradually changed from the first short-circuit current to the second short-circuit current through the third short-circuit current.

14. The method of claim 1, further comprising:
a welding wire feeding, in the start period and the steady period, for feeding a welding wire at a welding wire feed speed, wherein:
the welding wire is fed in alternating forward and backward directions at a predetermined frequency and a predetermined amplitude.

15. The method of claim 1, further comprising:
a programmed current setting, before the first welding, for setting a programmed current, wherein:
the third increase slope, the fourth increase slope and a welding current at the second inflection point corresponds to the programmed current.

16. The method of claim 1, further comprising:
a programmed current setting, before the first welding, for setting a programmed current, wherein:
an average of the welding wire feed speed corresponds to the programmed current.

* * * * *